Sept. 22, 1925.

P. WILSON ET AL

COFFEE URN COVER

Filed Jan. 2, 1924

1,554,612

INVENTORS:
Paul Wilson
George S. Cooper
BY
ATTORNEY

Patented Sept. 22, 1925.

1,554,612

UNITED STATES PATENT OFFICE

PAUL WILSON AND GEORGE S. COOPER, OF SEATTLE, WASHINGTON.

COFFEE-URN COVER.

Application filed January 2, 1924. Serial No. 683,867.

*To all whom it may concern:*

Be it known that we, PAUL WILSON and GEORGE S. COOPER, citizens of the United States, residing at Seattle, in the county of King and State of Washington, have invented certain new and useful Improvements in Coffee-Urn Covers, of which the following is a specification.

This invention relates to apparatus for brewing coffee and our object, generally, is the perfecting of apparatus of this character to improve the quality and strength of the produced beverage.

Other objects and advantages of the invention will appear from the following specification.

The invention consists in the novel construction, adaptation and combination of devices hereinafter described and claimed.

In the accompanying drawing,—

Figure 1:
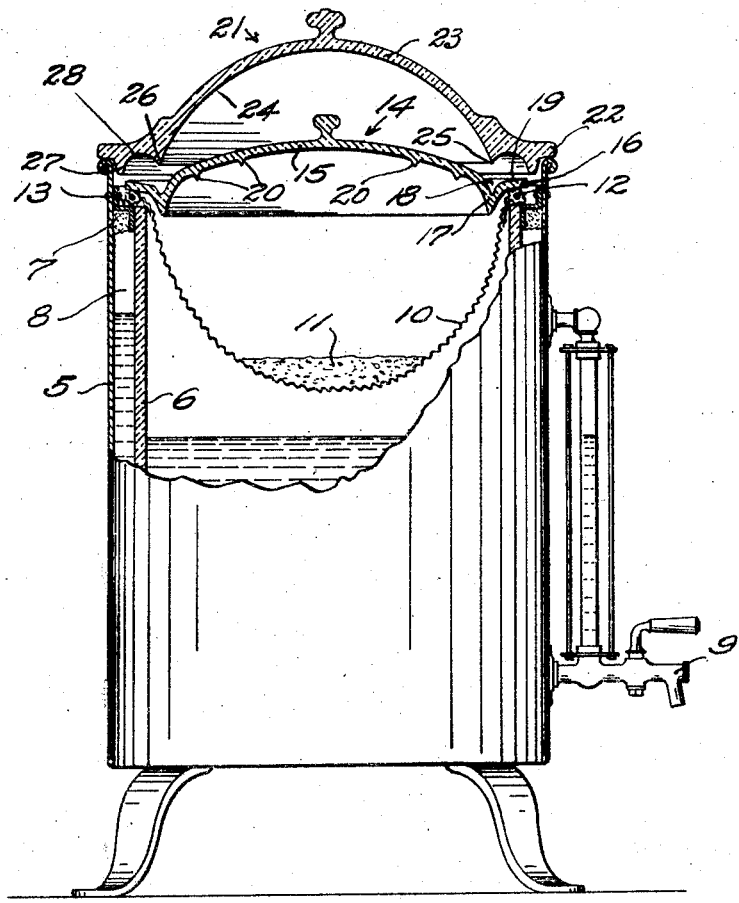
Figure 2:
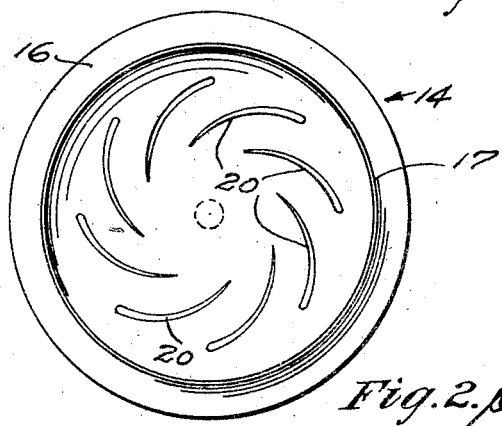

Figure 1 is a vertical section partly in elevation of a coffee urn embodying the invention; and Fig. 2 is an underside plan view of the inner cover.

In said drawing, the reference numeral 5 represents the outer casing of a coffee urn and 6 its inner casing, usually of porcelain, which is connected to the outer casing by means of a flanged metal ring 7 disposed at a short distance below the top of the outer casing. The annular space 8 between the said casings serves as a container for hot water for retaining the contents of the inner casing at a suitable temperature. 9 represents a faucet whereby the liquid contents of the inner casing is drawn off.

10 represents a bag of cloth or other suitable porous material in which ground coffee, indicated by 11, is held in the making of the coffee beverage. Said bag is secured to a metal ring 12 which is supported upon the annular ledge 13 provided by the ring 7.

The above described parts are or may be of known or suitable construction.

Hitherto, urn covers of metal, usually copper, have been employed and against which vapors or steam containing chemical acids from the coffee-brew, attack the cover and corrode the same, thereby contaminating the fluid condensations which falling into the brew, not only render the same of an inferior quality, but poisonous to the consumer.

To overcome these and other objections, we provide covers of a non-corrosive material such, for instance, as porcelain or glass for the open upper ends of both of said casings.

The inner casing cover 14 is formed to provide a dome-like central portion 15 and a substantially horizontal rim 16 adapted to rest upon the urn ledge 13 or, as shown, upon the ring 12 of the bag 10 when the same is in use.

Intermediate its dome and rim portions, said cover is provided at its underside with a circumferentially disposed downwardly directed ridge 17 terminating in a sharp lower edge, and in its upper side with a circumferential groove 18.

The upper surface of the rim 16 is formed to slope downwardly as at 19 toward said groove.

A plurality of arcuate projections 20 are provided on the underside of the cover and within the circle of the ridge 17.

As shown, in Fig. 2, the projections 20 are desirably arranged symmetrically with respect to the center of the cover and somewhat spirally with respect thereto so as to facilitate the collecting and dripping of vapor condensations occurring within the central under surface of the cover referred to. Any condensation of the vapor upon said cover which may pass outside of the zone of said projections will gravitate to and drop from the encircling ridge 17. The other cover 21 above mentioned has a rim 22 to seat upon the upper edge of the outer casing 5, and a central dome-like portion 23 to afford an underneath concave surface 24 which terminates in an edge 25 of a downwardly directed ridge 26 which is arranged to be directly above the groove 18 of the inner cover 14.

The cover 21 is provided adjacent its periphery with a downwardly directed flange 27 to position the cover centrally of the casing. The under surface of the outer cover part between the ridge 26 and the flange element 27 is made concave as at 28, such concavity extending upwardly above the plane of the lower edge of the ridge so that a large proportion of condensations upon such concave surface will be conducted inwardly to drip from the ridge into the channel or groove 18 of the inner cover.

The construction and application of the present invention will, it is believed, be understood from the foregoing description taken in connection with the drawing.

It is to be noted, however, that by the provision of coffee-urn covers of non-corrosive material that the coffee beverage is rendered less injurious to the consumer and more pleasant to his palate.

The peculiar formation of the inner and outer covers afford means whereby the condensations upon the former are caused to be returned into the coffee container without coming into contact with any metal; while the outer cover serves to deposit most of the condensations thereupon upon the top of the inner cover to be collected in the groove 18.

Furthermore, the two covers cooperate to provide a heat insulating space therebetween to maintain the temperature of the inner cover most suitable for the production of a good quality of beverage.

What we claim, is,—

1. In a coffee-urn having an outer casing and an inner casing connected together to provide an annular water containing space therebetween, of outer and inner covers for the respective casings, said inner cover being provided in its top with a circular groove, the underside of said inner cover being formed to provide adjacent to its periphery with a downwardly extending circular ridge, the outer cover being formed with an under surface to provide a downwardly extending ridge located between two concave portions of said surface and directly above the groove of the inner cover.

2. In a coffee-urn having an outer casing and an inner casing connected together to provide a ledge upon the latter at a distance below the upper end of the outer casing, covers of non-corrosive material provided for the inner and outer casings to afford a heat insulating space therebetween, the cover for the inner casing being formed adjacent to its periphery with a downwardly extending circular ridge, a plurality of projections extending below the surface of the space enclosed by said circular ridge, the cover for the outer casing being provided with a circumferentially disposed ridge located directly above the groove of the cover for the inner casing.

Signed at Seattle, Washington, this 22nd day of December, 1923.

PAUL WILSON.
GEORGE S. COOPER.